United States Patent
Hino et al.

(10) Patent No.: US 9,229,236 B2
(45) Date of Patent: Jan. 5, 2016

(54) HEAD-MOUNTED DISPLAY WITH HALF MIRROR AREA

(71) Applicant: SEIKO EPSON CORPORATION, Tokyo (JP)

(72) Inventors: Makiko Hino, Matsumoto (JP); Yasushi Mizoguchi, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 88 days.

(21) Appl. No.: 14/138,996

(22) Filed: Dec. 23, 2013

(65) Prior Publication Data

US 2014/0184477 A1 Jul. 3, 2014

(30) Foreign Application Priority Data

Dec. 27, 2012 (JP) ................................. 2012-284461

(51) Int. Cl.
*G02B 27/01* (2006.01)
*G06F 3/00* (2006.01)

(52) U.S. Cl.
CPC ............ *G02B 27/0172* (2013.01); *G06F 3/005* (2013.01); *G02B 2027/0138* (2013.01); *G02B 2027/0141* (2013.01)

(58) Field of Classification Search
CPC ................... G02B 27/0172; G02B 2027/0141; G02B 2027/0138; G02B 2027/0178; G06F 1/163; G06F 3/005; G06F 3/011; G06F 3/012; G06F 3/103; G02C 11/10; A61B 5/6803; H04N 13/044

USPC .............................................................. 345/8
See application file for complete search history.

(56) References Cited

U.S. PATENT DOCUMENTS

| | | | | |
|---|---|---|---|---|
| 5,341,242 | A  * | 8/1994 | Gilboa ............... | G02B 27/0172 359/365 |
| 6,518,939 | B1 * | 2/2003 | Kikuchi ............................ | 345/8 |
| 8,325,263 | B2 | 12/2012 | Kato et al. | |
| 2003/0085866 | A1 * | 5/2003 | Bimber et al. ................ | 345/156 |
| 2004/0257493 | A1 * | 12/2004 | Lim ................................ | 349/64 |
| 2010/0103077 | A1 * | 4/2010 | Sugiyama et al. ................ | 345/8 |
| 2012/0050143 | A1 * | 3/2012 | Border ................. | G09G 3/3611 345/8 |
| 2012/0212484 | A1 * | 8/2012 | Haddick et al. ............... | 345/419 |

FOREIGN PATENT DOCUMENTS

| | | |
|---|---|---|
| JP | A-08-194172 | 7/1996 |
| JP | A-08-307753 | 11/1996 |
| JP | A-10-142552 | 5/1998 |
| JP | A-10-221637 | 8/1998 |
| JP | A-2005-172851 | 6/2005 |
| JP | A-2010-193287 | 9/2010 |
| JP | A-2011-076503 | 4/2011 |

\* cited by examiner

*Primary Examiner* — Larry Sternbane
(74) *Attorney, Agent, or Firm* — Oliff PLC

(57) ABSTRACT

A head-mounted display includes: a scanning unit that scans signal light modulated according to an image signal; a display unit on which the signal light from the scanning unit is incident and that is transmissive to visible light, the display unit including a half mirror area reflecting the signal light from the scanning unit and a transmission area having a transmittance higher than that of the half mirror area for visible light; and a control unit that scans, based on a use condition, the signal light over an area including the transmission area.

13 Claims, 11 Drawing Sheets

HEAD-MOUNTED DISPLAY WITH HALF MIRROR AREA

BACKGROUND

1. Technical Field

The present invention relates to a head-mounted display.

2. Related Art

Heretofore, a head-mounted display (hereinafter referred to as "HMD") including an image display device that displays an image by, for example, scanning light with a scanning unit has been known (for example, refer to JP-A-2011-76503).

However, the HMD has a problem in that the HMD does not have a function of allowing an observer to indicate his/her intention to an observed person. Examples of the indication of the intention include indicating a physical disorder. Specifically, when the observer is a disabled person, the observer sometimes cannot indicate properly a physical disorder or the like to the observed person. Another example of the indication of the intention is the case in which when an HMD includes an imaging unit as in the HMD described above, an image of the observed person is sometimes captured irrespective of the observed person's intention. That is, even when an image of the observed person is being captured, nothing is shown clearly on the HMD, and the observer does not indicate that the image is being captured to the observed person. Therefore, it is difficult for the observed person to know whether or not the image is being captured.

SUMMARY

An advantage of some aspects of the invention is to solve at least a part of the problems described above, and the invention can be implemented as the following application examples.

APPLICATION EXAMPLE 1

A head-mounted display according to this application example includes: a scanning unit that scans signal light modulated according to an image signal; a display unit on which the signal light from the scanning unit is incident and that is transmissive to visible light, the display unit including a half mirror area reflecting the signal light from the scanning unit and a transmission area having a transmittance higher than that of the half mirror area for visible light; and a control unit that scans, based on a use condition, the signal light over an area including the transmission area.

According to the application example, the signal light is incident on the transmission area based on the use condition. With this configuration, since the signal light is emitted from the transmission area, the observer can indicate his/her intention to the observed person. Hence, it is possible to provide the head-mounted display having a function of allowing the observer to indicate his/her intention to the observed person.

APPLICATION EXAMPLE 2

In the head-mounted display according to the application example described above, it is preferable that the use condition includes a first condition and a second condition, and that the control unit scans the signal light over the half mirror area in the first condition and scans the signal light over the area including the transmission area in the second condition.

According to this application example, an image is displayed on the display unit in the first condition, and the control unit scans the signal light over the area including the transmission area in the second condition. With this configuration, since the signal light is emitted from the transmission area in the second condition, the observer can indicate his/her intention to the observed person.

APPLICATION EXAMPLE 3

In the head-mounted display according to the application example described above, it is preferable that the head-mounted display further includes an imaging unit that captures an image, and that the control unit applies the second condition when driving the imaging unit.

According to this application example, since the signal light is incident on the transmission area when the imaging unit is driven, the signal light is emitted from the transmission area. With this configuration, the observer indicates that an image is being captured by the imaging unit mounted on the head-mounted display to the observed person, so that secret filming, cheating, information leakage, and the like can be prevented.

APPLICATION EXAMPLE 4

In the head-mounted display according to the application example described above, it is preferable that the transmission area is positioned outside a scanning area where the signal light is scanned over the half mirror area, and that the control unit scans the signal light over the area including the transmission area by expanding a scanning angle range more in the second condition than in the first condition.

According to this application example, the control unit can scan the signal light over the transmission area.

APPLICATION EXAMPLE 5

In the head-mounted display according to the application example described above, it is preferable that the scanning unit scans the signal light by resonance in a first direction and scans the signal light by non-resonance in a second direction intersecting the first direction, and that the control unit expands the scanning angle range in the second direction more in the second condition than in the first condition.

According to this application example, since the scanning angle range of non-resonant scanning is expanded, adjustment of a resonant frequency required when expanding the scanning angle range of resonant scanning is unnecessary. With this configuration, the scanning angle range can be expanded easier than in the case of expanding the scanning angle range of resonant scanning.

APPLICATION EXAMPLE 6

In the head-mounted display according to the application example described above, it is preferable that the transmission area includes a diffusion area having a diffuse transmittance higher than that of the half mirror area for visible light.

According to this application example, the signal light incident on the diffusion area is diffused. With this configuration, it is possible to expand a range that can be used for allowing the observer to indicate his/her intention to the observed person. The "diffuse transmittance" as used herein means the intensity ratio of a diffused light component to incident light in a visible light area.

APPLICATION EXAMPLE 7

In the head-mounted display according to the application example described above, it is preferable that a diffusion film is formed in the diffusion area.

According to this application example, the diffusion area can be easily formed.

APPLICATION EXAMPLE 8

In the head-mounted display according to the application example described above, it is preferable that the area including the transmission area is the half mirror area and the transmission area.

According to this application example, when the control unit scans the signal light over the transmission area, the signal light can be scanned over the half mirror area. With this configuration, even when the control unit scans the signal light over the transmission area, an image can be displayed on the display unit.

APPLICATION EXAMPLE 9

In the head-mounted display according to the application example described above, it is preferable that the transmission area is adjacent to the half mirror area.

According to this application example, the scanning angle range that is expanded when the control unit scans the signal light from the half mirror area to the area including the transmission area can be made small. The "adjacent" as used herein includes vicinity arrangement in a non-contact state.

APPLICATION EXAMPLE 10

In the head-mounted display according to the application example described above, it is preferable that the head-mounted display further includes an eyeglass-type frame including a front portion including a nose pad portion, and that the scanning unit is positioned on the nose pad portion side of the front portion and on the side closer to the center of the front portion than an optical axis of the signal light reflected by the display unit.

According to this application example, since the scanning unit is positioned on the nose pad portion side of the front portion, a portion bulging forward relative to the observer's face can be prevented from being formed in the head-mounted display. Moreover, since the scanning unit is positioned on the side closer to the center of the front portion than the optical axis of the signal light reflected by the display unit, a portion bulging laterally relative to the observer's face can be prevented from being formed in the head-mounted display.

APPLICATION EXAMPLE 11

In the head-mounted display according to the application example described above, it is preferable that the head-mounted display further includes a signal light generating unit that generates the signal light, that the frame includes a temple portion connected to the front portion and a modern portion as an end of the temple portion, and that the signal light generating unit is disposed at the modern portion.

According to this application example, the weight balance of the head-mounted display can be made excellent.

APPLICATION EXAMPLE 12

In the head-mounted display according to the application example described above, it is preferable that the scanning unit further includes a base portion on which a reflector having a reflecting surface reflecting the signal light is disposed, an axial portion that supports the base portion oscillatable about a first axis, a frame body portion that is oscillatable about a second axis intersecting the first axis, a permanent magnet that is disposed at the frame body portion, a coil, and a voltage applying unit that applies a voltage to the coil, that the base portion and the frame body portion are connected with the axial portion, that the permanent magnet is arranged in plan view in a direction inclined to the first axis and the second axis, and that the voltage applying unit applies to the coil a voltage obtained by superimposing on each other a first voltage at a first frequency causing the base portion to oscillate about the first axis and a second voltage at a second frequency causing the frame body portion to oscillate about the second axis.

According to this application example, the base portion on which the reflector is disposed can be oscillated about the first axis and the second axis, so that scanning can be easily performed on the display unit.

APPLICATION EXAMPLE 13

In the head-mounted display according to the application example described above, it is preferable that the scanning unit scans the signal light over the area including the transmission area by making the second voltage higher in the second condition than in the first condition.

According to this application example, the scanning angle range can be easily expanded.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
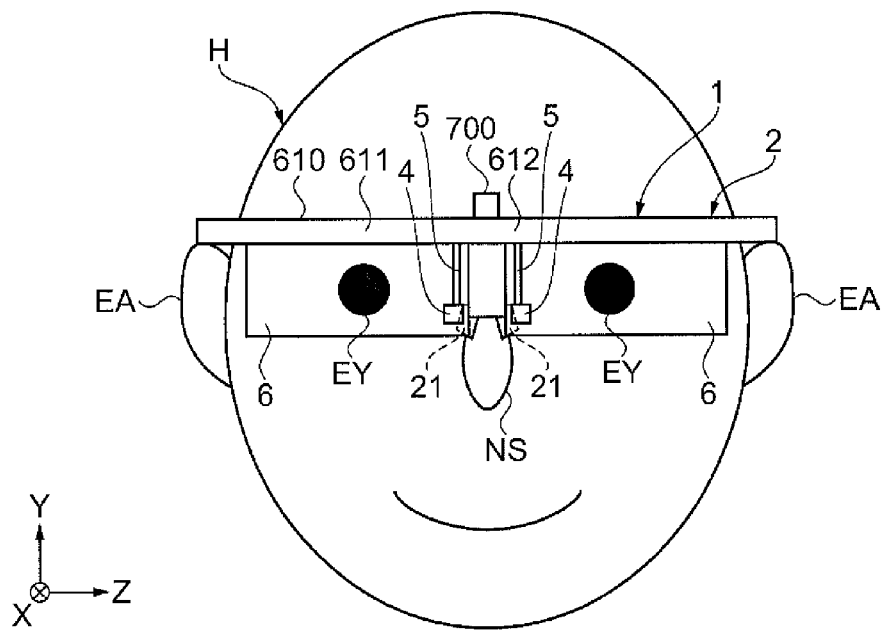
FIGS. 1A and 1B are schematic views showing a schematic configuration of an HMD according to Embodiment 1.

Hereinafter, preferred Embodiments 1 to 5 of an HMD according to the invention will be described with reference to the accompanying drawings. In the drawings described below, the scale of each member or the like is different from the actual scale so that the member or the like has a recognizable size.

Embodiment 1

Figure 1B:
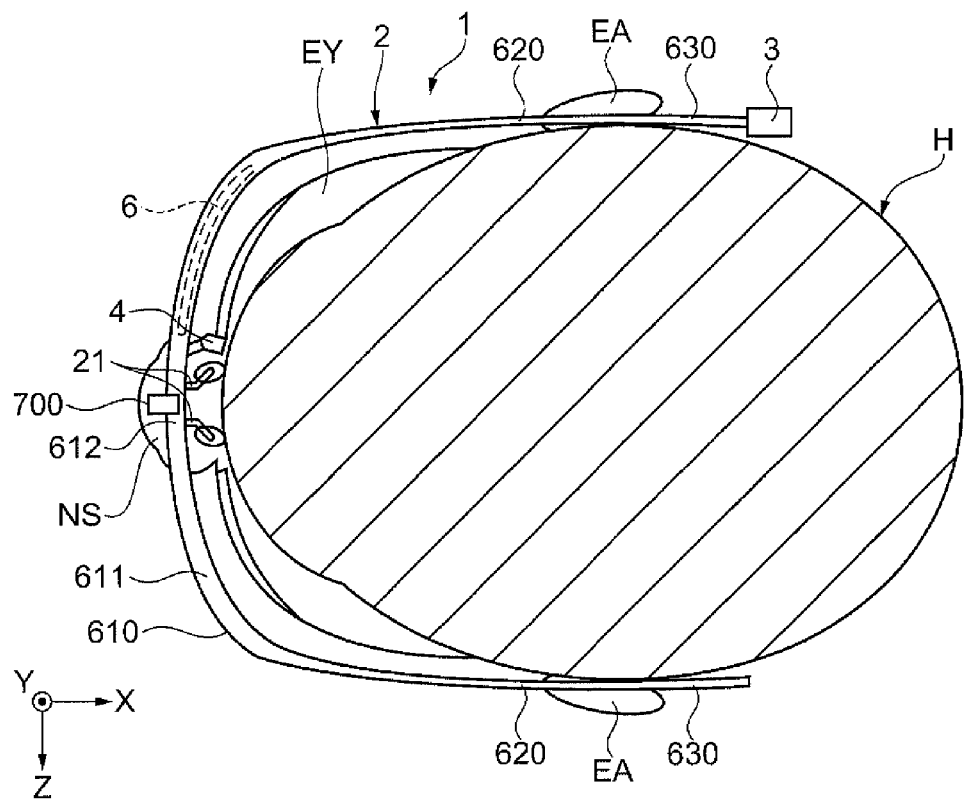
Figure 2:
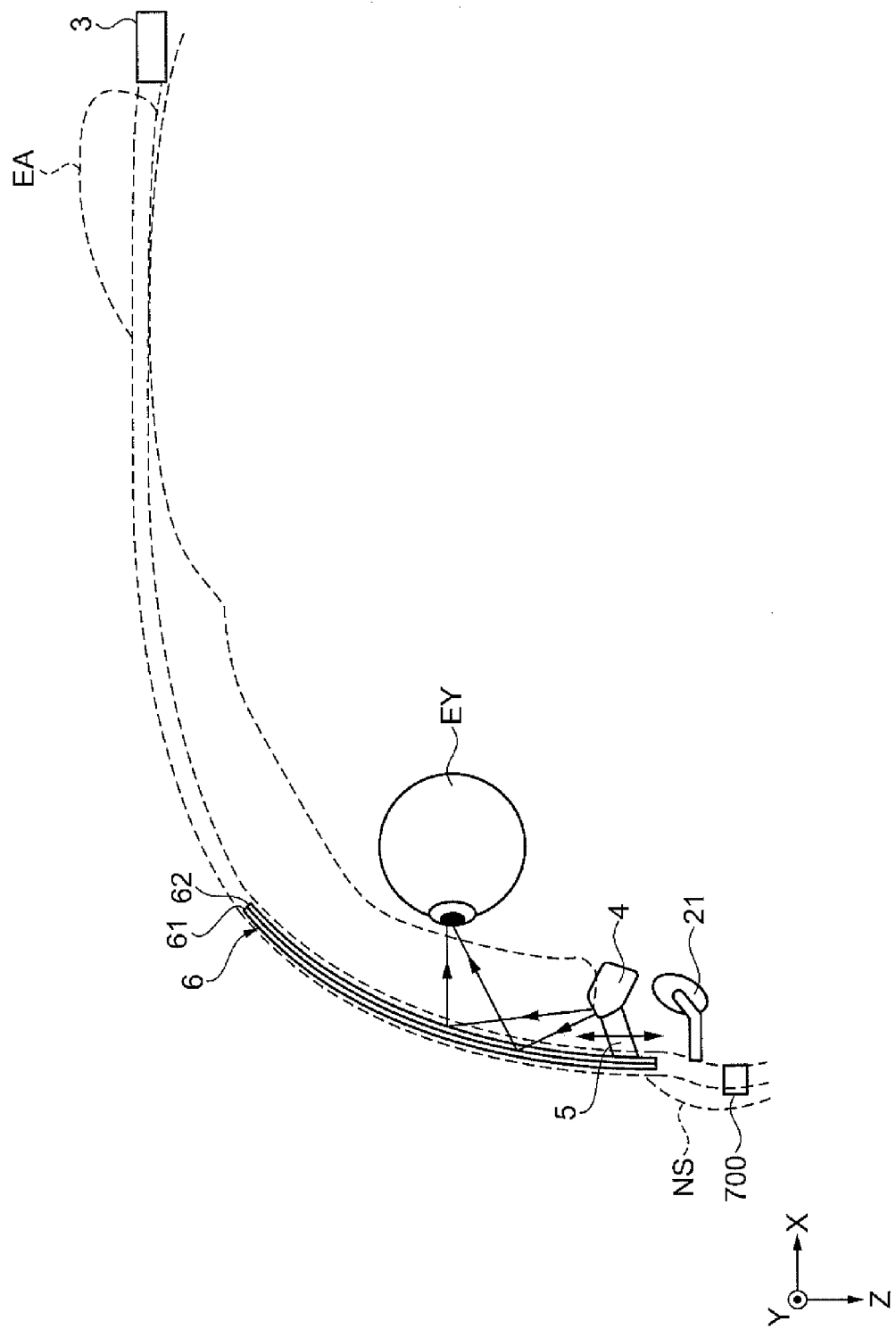
FIG. 2 is a partially enlarged view of the HMD according to Embodiment 1.
Figure 3:
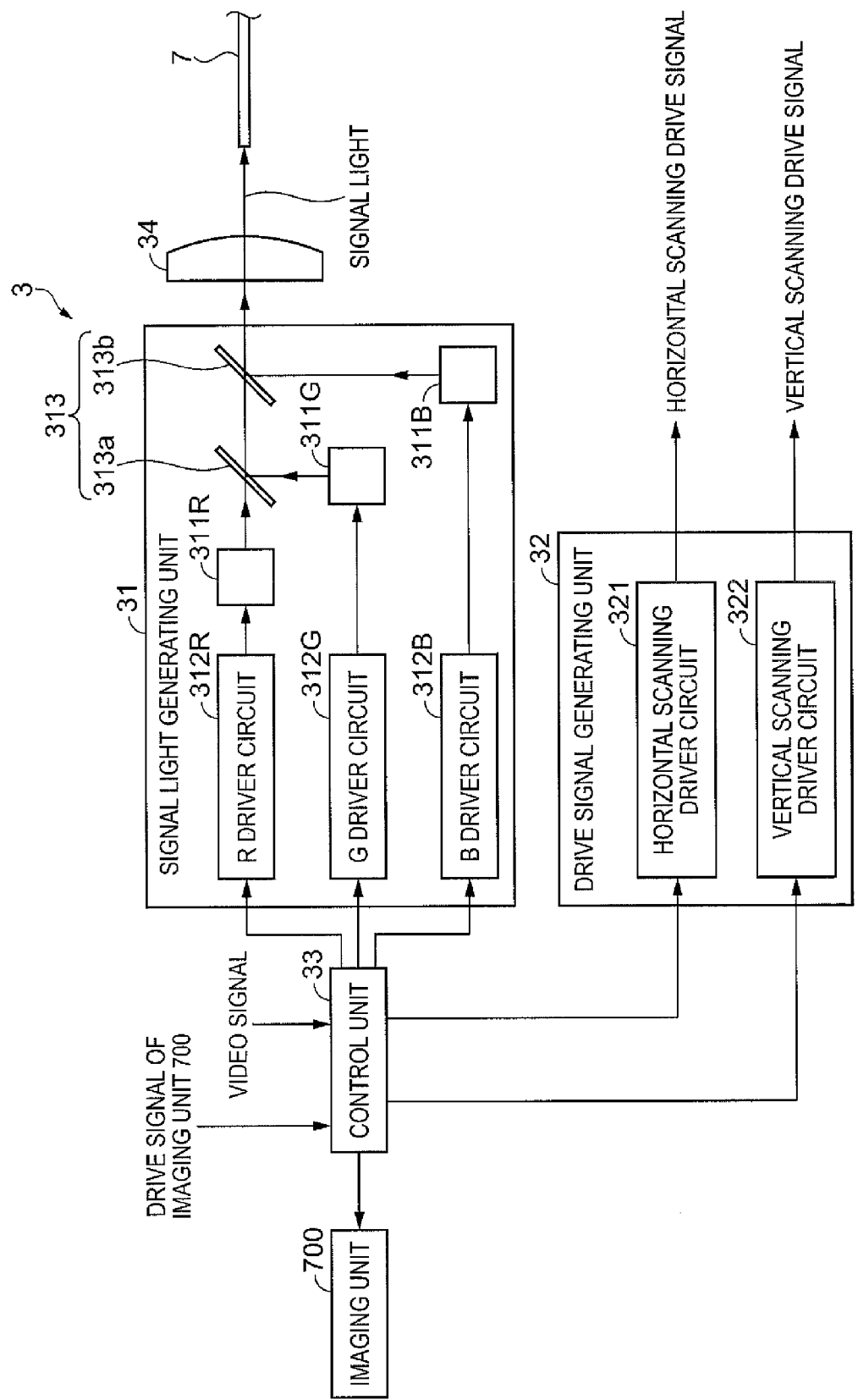
FIG. 3 is a block diagram showing a configuration of a driving unit.
Figure 4A:
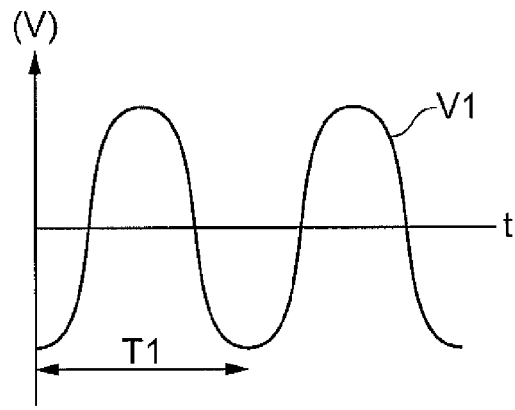
FIGS. 4A and 4B are explanatory graphs each showing an example of a generated voltage.
Figure 4B:
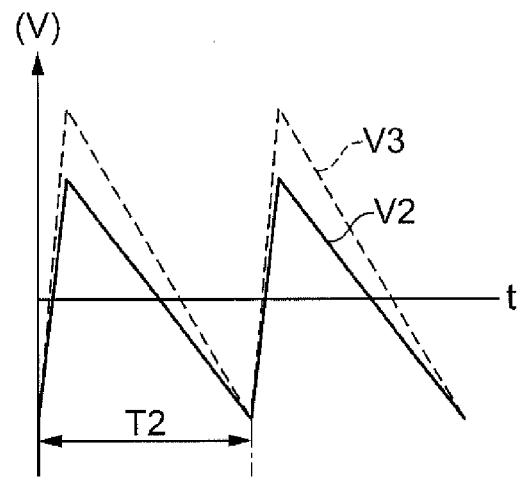
Figure 5:
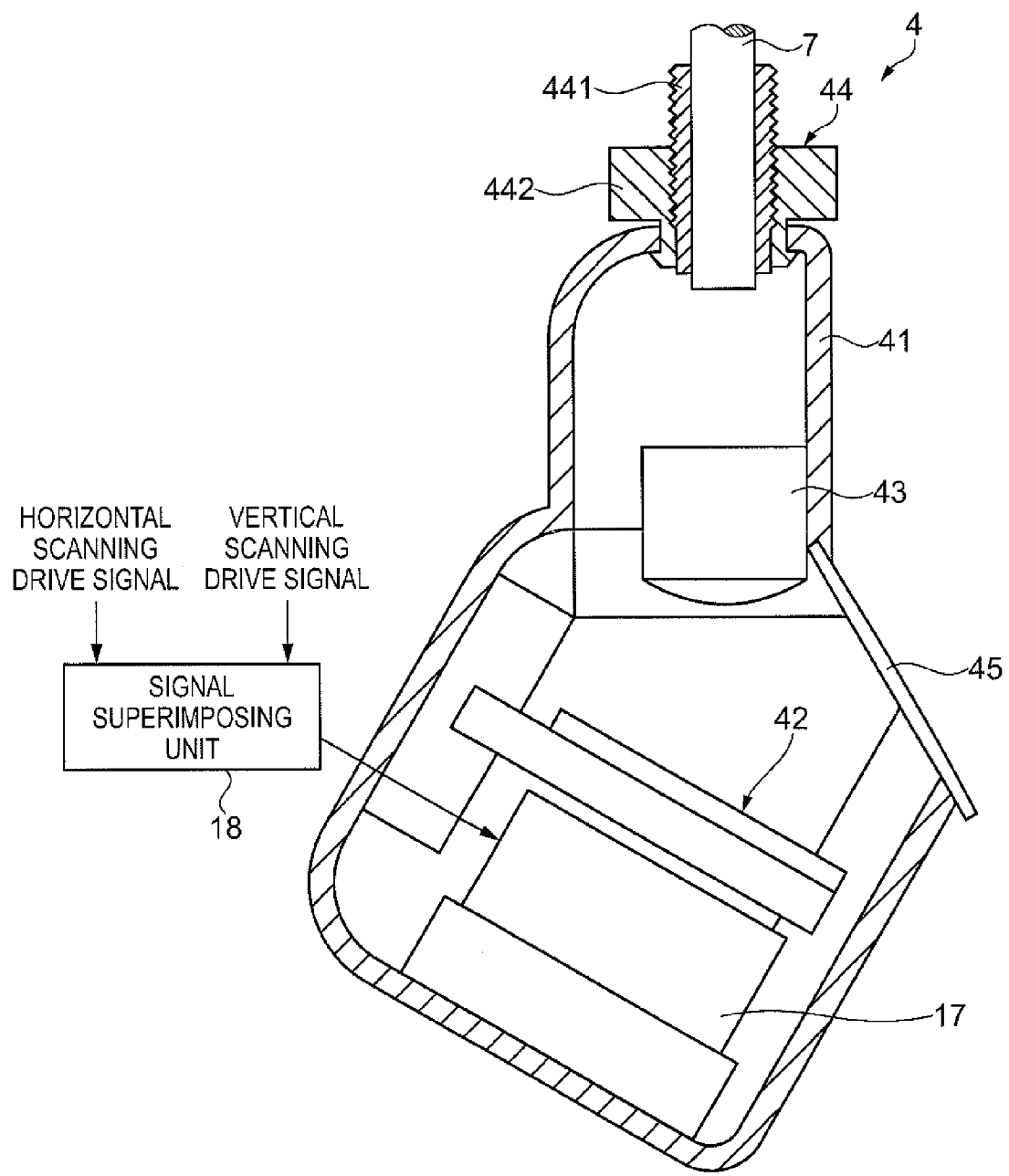
FIG. 5 is a schematic configuration view of a scanning light emitting unit according to Embodiment 1.
Figure 6:
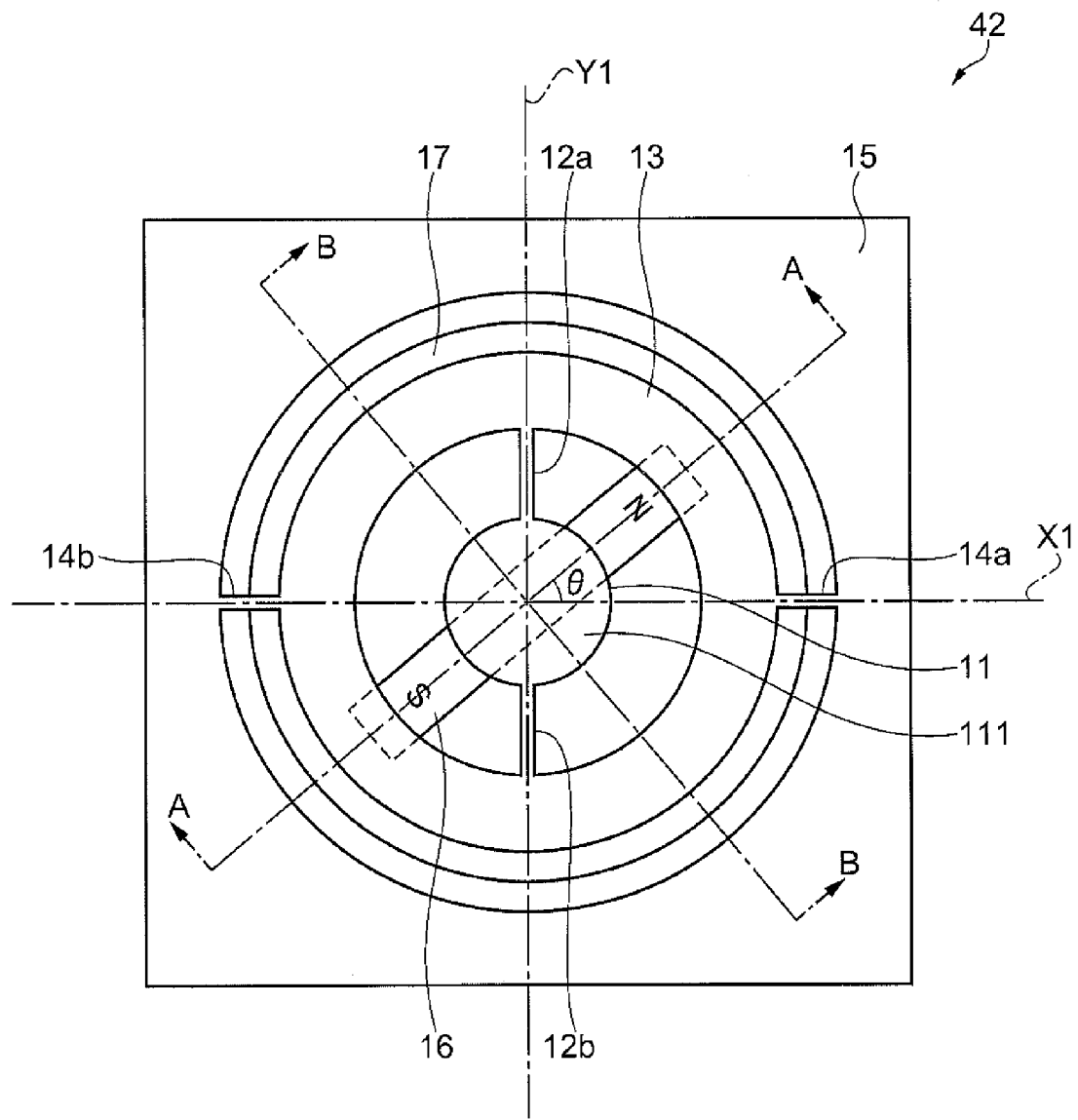
FIG. 6 is a plan view of an optical scanner according to Embodiment 1.
Figure 7A:
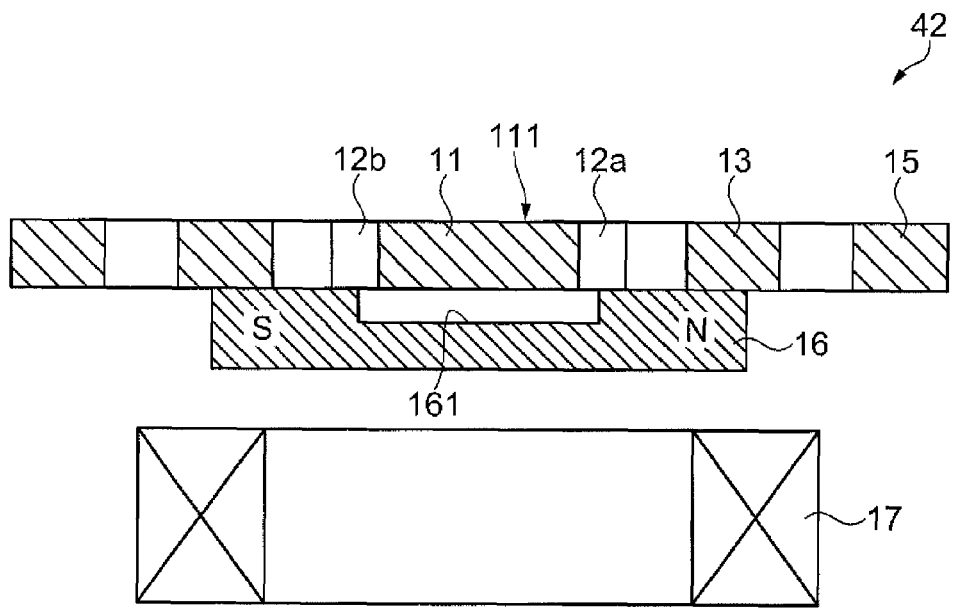
FIGS. 7A and 7B are cross-sectional views of the optical scanner according to Embodiment 1.
Figure 7B:
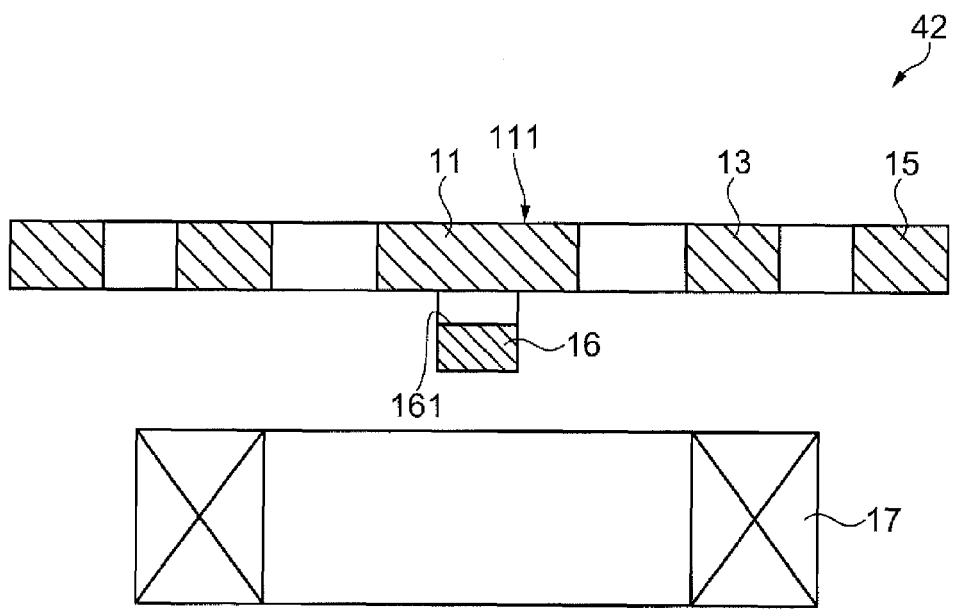
Figure 8:
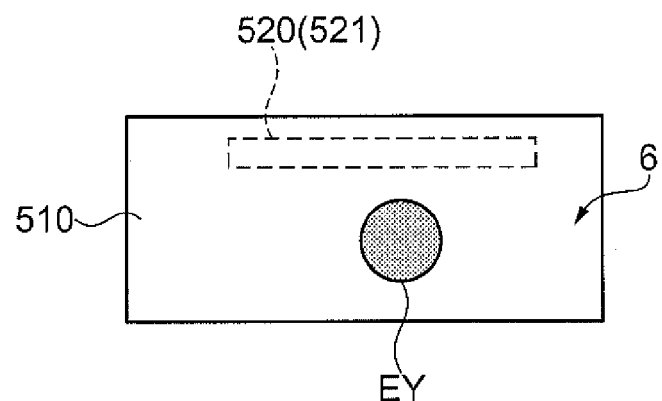
FIG. 8 is a schematic view showing a schematic configuration of a display unit according to Embodiment 1.
Figure 9A:
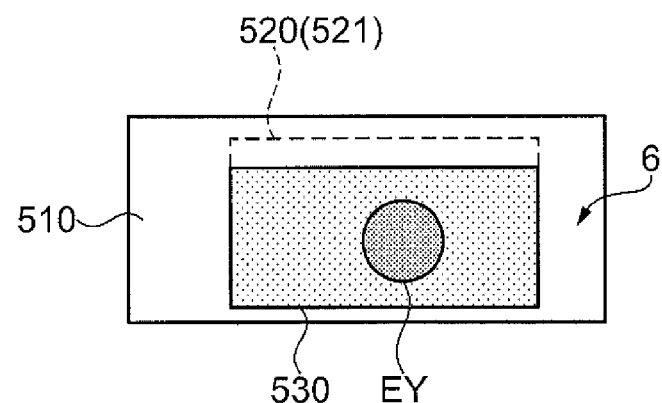
FIGS. 9A and 9B are schematic views each showing a schematic configuration of the display unit and a scanning area according to Embodiment 1.
Figure 9B:
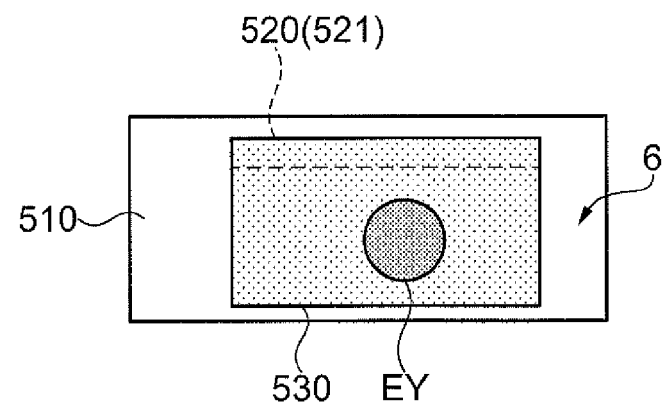

FIG. 1A is an elevation view showing a schematic configuration of an HMD according to Embodiment 1. FIG. 1B is a plan view showing a schematic configuration of the HMD according to Embodiment 1. FIG. 2 is a partially enlarged view of the HMD according to Embodiment 1. FIG. 3 is a block diagram showing a configuration of a driving unit. FIGS. 4A and 4B are explanatory graphs each showing an example of a generated voltage. FIG. 5 is a schematic configuration view of a scanning light emitting unit according to Embodiment 1. FIG. 6 is a plan view of an optical scanner according to Embodiment 1. FIG. 7A is a cross-sectional view (cross-sectional view taken along line A-A) of the optical scanner according to Embodiment 1. FIG. 7B is a cross-sectional view (cross-sectional view taken along line B-B) of the optical scanner according to Embodiment 1. FIG. 8 is a schematic view showing a schematic configuration of a display unit according to Embodiment 1. FIG. 9A is a schematic view showing a schematic configuration of the display unit and a scanning area in a first condition according to Embodiment 1. FIG. 9B is a schematic view showing a schematic configuration of the display unit and the scanning area in a second condition according to Embodiment 1.

In FIGS. 1A, 1B, and 2, for convenience of description, an X-axis, a Y-axis, and a Z-axis are shown as three axes orthogonal to each other. The tip side of the illustrated arrow of each axis is defined as "positive side" while the base side thereof is defined as "negative side". Moreover, a direction parallel to the X-axis is referred to as "X-axis direction; a direction parallel to the Y-axis is referred to as "Y-axis direction"; and a direction parallel to the Z-axis is referred to as "Z-axis direction". The X-axis, the Y-axis, and the Z-axis are set such that when an HMD 1 described later is mounted on a head H of an observer, the X-axis direction is a front-back direction of the head H, the Y-axis direction is an up-and-down direction of the head H, and the Z-axis direction is a left-and-right direction of the head H.

As shown in FIGS. 1A and 1B, the HMD 1 of Embodiment 1 is an HMD having an eyeglass-like appearance. The HMD 1 is used by being mounted on the observer's head H and allows the observer to visually recognize an image based on a virtual image with an outside world image in a superimposed state. The HMD 1 includes a frame 2, a signal generating unit 3, scanning light emitting units 4, and display units 6. In Embodiment 1, the HMD 1 further includes a CCD (charge coupled device) camera 700 as an imaging unit.

In the HMD 1, the signal generating unit 3 generates signal light modulated according to image information, the scanning light emitting units 4 two-dimensionally scan the signal light to emit scanning light, and the display units 6 reflect the scanning light toward eyes EY of the observer. With this configuration, it is possible to allow the observer to visually recognize the virtual image according to the image information.

The HMD 1 forms separately a right-eye virtual image and a left-eye virtual image. For convenience of description, however, a configuration for forming the right-eye virtual image will be representatively shown in the drawings. A configuration for forming the left-eye virtual image is similar to that of the right-eye virtual image, and therefore, the illustration thereof is omitted.

Hereinafter, each portion of the HMD 1 will be sequentially described in detail.

Frame

As shown in FIGS. 1A, 1B, and 2, the frame 2 has an eyeglass frame-like shape and has a function of supporting the signal generating unit 3, the scanning light emitting units 4, the display units 6, and the CCD camera 700.

Moreover, the frame 2 includes a front portion 610, temple portions 620, and modern portions 630. The front portion 610 supports the scanning light emitting units 4, the display units 6, the CCD camera 700, and nose pad portions 21. The temple portions 620 are connected to the front portion 610 and abut on ears EA of the observer. The modern portions 630 are each an end of the temple portion 620 opposite from the front portion 610. The nose pad portions 21 abut on the observer's nose NS at the time of use, and support the HMD 1 relative to the observer's head H. The front portion 610 includes rim portions 611 and a bridge portion 612.

The nose pad portions 21 are configured to be capable of adjusting the position of the frame 2 relative to the observer at the time of use. The shape of the frame 2 is not limited to that shown in the drawings as long as the frame can be mounted on the observer's head H.

Signal Generating Unit

As shown in FIGS. 1B and 2, the signal generating unit 3 is attached to the modern portion 630 of the frame 2. That is, the signal generating unit 3 is arranged on the opposite side of the observer's ear EA to the eye EY at the time of use. With this configuration, the weight balance of the head-mounted display can be made excellent.

The signal generating unit 3 has two functions: one is to generate signal light that is scanned by an optical scanner 42 as a scanning unit of the scanning light emitting unit 4 described later; and the other is to generate a drive signal for driving the optical scanner 42. As shown in FIG. 3, the signal generating unit 3 includes a signal light generating unit 31, a drive signal generating unit 32, a control unit 33, and a lens 34. The signal light generating unit 31 generates the signal light that is scanned by the optical scanner 42 of the scanning light emitting unit 4 described later.

The signal light generating unit 31 includes a plurality of light sources 311R, 311G, and 311B, a plurality of driver circuits 312R, 312G, and 312B, and a light combining unit 313. The light source 311R emits red light; the light source 311G emits green light; and the light source 311B emits blue light. With the use of these three color lights, a full-color image can be displayed.

Although not particularly limited, a laser diode or an LED, for example, can be used for each of the light sources 311R, 311G, and 311B. The light sources 311R, 311G, and 311B are electrically connected to the driver circuits 312R, 312G, and 312B, respectively.

The driver circuit 312R has a function of driving the light source 311R; the driver circuit 312G has a function of driving the light source 311G; and the driver circuit 312B has a function of driving the light source 311B. Three (three color) lights emitted from the light sources 311R, 311G, and 311B driven by the driver circuits 312R, 312G, and 312B are incident on the light combining unit 313.

The light combining unit 313 combines the lights from the plurality of light sources 311R, 311G, and 311B. With this configuration, it is possible to reduce the number of optical fibers for transmitting the signal light generated by the signal light generating unit 31 to the scanning light emitting unit 4. Therefore, in Embodiment 1, the signal light can be transmitted from the signal generating unit 3 to the scanning light emitting unit 4 via one optical fiber 7 disposed along the temple portion 620 of the frame 2.

In Embodiment 1, the light combining unit 313 includes two dichroic mirrors 313a and 313b. The dichroic mirror 313a has a function of transmitting red light therethrough and reflecting green light. The dichroic mirror 313b has a function of transmitting red light and green light therethrough and reflecting blue light.

With the use of the dichroic mirrors 313a and 313b, the three color lights, red light, green light, and blue light, from the light sources 311R, 311G, and 311B are combined to form signal light. In Embodiment 1, the light sources 311R, 311G, and 311B are arranged such that optical path lengths of the red light, green light, and blue light from the light sources 311R, 311G, and 311B are equal to each other.

The light combining unit 313 is not limited to the above-described configuration using the dichroic mirrors 313a and 313b, but may be composed of, for example, an optical waveguide, an optical fiber, or the like. The signal light generated by the signal light generating unit 31 is input through the lens 34 to the optical fiber 7. Then, the signal light is transmitted via the optical fiber 7 to the optical scanner 42 of the scanning light emitting unit 4 described later.

With the use of the optical fiber 7 that introduces the signal light generated by the signal light generating unit to the optical scanner 42, the flexibility of the installation position of the signal light generating unit 31 is increased. The lens 34 condenses the signal light generated by the signal light generating unit 31 to input the signal light to the optical fiber 7. The lens 34 is disposed as necessary, and can be omitted. For example, by disposing a lens between each of the light sources 311R, 311G, and 311B and the light combining unit 313 instead of the lens 34, the signal light can be input to the optical fiber 7.

The drive signal generating unit 32 generates a drive signal for driving the optical scanner 42 of the scanning light emitting unit 4 described later. The drive signal generating unit 32 includes a driver circuit 321 (first driver circuit) and a driver circuit 322 (second driver circuit). The driver circuit 321 generates a first drive signal V1 used for scanning in a first direction (horizontal scanning) of the optical scanner 42. The driver circuit 322 generates a second drive signal V2 and a third drive signal V3 used for scanning in a second direction (vertical scanning) orthogonal to the first direction of the optical scanner 42.

For example, as shown in FIG. 4A, the driver circuit 321 generates the first drive signal V1 (voltage for horizontal scanning) that changes periodically with a period T1. As shown in FIG. 4B, the driver circuit 322 generates the second drive signal V2 (voltage for vertical scanning) that changes periodically with a period T2 different from the period T1, and the third drive signal V3 (voltage for vertical scanning) whose voltage is higher than that of the second drive signal V2. The first drive signal V1, the second drive signal V2, and the third drive signal V3 will be described in detail later.

The drive signal generating unit 32 is electrically connected to the optical scanner 42 of the scanning light emitting unit 4 described later via a signal line (not shown). With this configuration, the drive signals (the first drive signal V1, the second drive signal V2, and the third drive signal V3) generated by the drive signal generating unit 32 are input to the optical scanner 42 of the scanning light emitting unit 4 described later. The driver circuits 312R, 312G, and 312B of the signal light generating unit 31 and the driver circuits 321 and 322 of the drive signal generating unit 32 are electrically connected to the control unit 33.

The control unit 33 has a function of controlling, based on a video signal (image signal), the driving of the driver circuits 312R, 312G, and 312E of the signal light generating unit 31 and the driver circuits 321 and 322 of the drive signal generating unit 32. With this configuration, the signal light generating unit 31 generates signal light modulated according to image information, and the drive signal generating unit 32 generates a drive signal according to the image information. Further, the control unit 33 has a function of driving the CCD camera 700 and controlling its imaging operation and the like.

Scanning Light Emitting Unit

As shown in FIGS. 1A, 1B, and 2, the scanning light emitting unit 4 is attached in the vicinity of the bridge portion 612 (in other words, in the vicinity of the center of the front portion 610) of the frame 2. That is, the scanning light emitting unit 4 is arranged so as to be positioned on the observer's nose NS side of the eye EY at the time of use. In other words, the scanning light emitting unit 4 is positioned between the observer's both eyes EY as viewed from the front of the observer at the time of use. Further in other words, the scanning light emitting unit 4 is positioned on the bridge portion 612 side (that is, the center side of the front portion 610) of the position of the optical axis of the signal light reflected by the display unit 6. With this configuration, a portion bulging laterally relative to the observer's face can be prevented from being formed in the HMD 1.

The scanning light emitting unit 4 is attached inside the frame 2. That is, the scanning light emitting unit 4 is arranged on the observer side of the display unit 6 described later (that is, the nose pad portion 21 side of the front portion 610) at the time of use. With this configuration, a portion bulging forward relative to the observer's face can be prevented from being formed in the HMD 1.

The scanning light emitting unit 4 is attached via a moving mechanism 5 to the frame 2 at a position different from the nose pad portion 21. The moving mechanism 5 is configured so as to be capable of moving the scanning light emitting unit 4 in a direction along the Z-axis relative to the frame 2. Therefore, the scanning light emitting unit 4 can move in the direction along the Z-axis relative to the display unit 6 described later. With this configuration, the image forming position (position at which the entire scanning light that extends in the horizontal direction and the vertical direction forms an image) of scanning light formed by scanning the signal light can be adjusted in an eye-width direction independently of adjusting the position of the nose pad portion 21.

As shown in FIG. 5, the scanning light emitting unit 4 includes a housing 41, the optical scanner 42, a lens (coupling lens) 43, a condensing position adjusting mechanism 44, and a lens (condensing lens) 45. The housing 41 accommodates the optical scanner 42 and the lens 43. The housing 41 has a dust- and drip-proof structure. To the housing 41, the optical fiber 7 is attached via the condensing position adjusting mechanism 44. The condensing position adjusting mechanism 44 will be described in detail later.

Further, the lens 45 is attached to the housing 41. The lens 45 constitutes a portion of the housing 41 (a portion of a wall). With this configuration, the number of components can be suppressed, and a reduction in size of the device can be achieved. The lens 45 will be described in detail later.

The optical scanner 42 is an optical scanner that two-dimensionally scans signal light from the signal light generating unit 31. Scanning light is formed by scanning the signal light with the optical scanner 42. As shown in FIG. 6, the optical scanner 42 includes a base portion 11, a pair of axial portions 12a and 12b (first axial portion), a frame body portion 13, a pair of axial portions 14a and 14b (second axial portion), a support portion 15, a permanent magnet 16, and a coil 17. In other words, the optical scanner 42 has a so-called gimbal structure.

The base portion 11 and the pair of axial portions 12a and 12b constitute a first vibrating system that oscillates (reciprocally pivots) about a Y1 axis (first axis). Moreover, the base portion 11, the pair of axial portions 12a and 12b, the frame body portion 13, the pair of axial portions 14a and 14b, and the permanent magnet 16 constitute a second vibrating system that oscillates (reciprocally pivots) about an X1 axis (second axis).

The optical scanner 42 includes a signal superimposing unit 18 (a voltage applying unit; refer to FIG. 5). The permanent magnet 16, the coil 17, the signal superimposing unit 18, and the drive signal generating unit 32 constitute a driving unit that drives the first vibrating system and the second vibrating system (that is, oscillates the base portion 11 about the X1 axis and the Y1 axis).

Hereinafter, each portion of the optical scanner 42 will be sequentially described in detail. The base portion 11 has a plate shape. A reflector 111 having light reflectivity is disposed on an upper surface (one of surfaces) of the base portion 11. In Embodiment 1, the base portion 11 has a circular shape in plan view. The plan-view shape of the base portion 11 is not limited to that, and may be, for example, an ellipse, or a polygon such as a quadrilateral. Moreover, the base portion 11 may have a shape having a dynamic deflection reducing structure that reduces the dynamic deflection of a portion at which the reflector 111 is disposed.

The frame body portion 13 has a frame shape, and is disposed to surround the base portion 11. In other words, the base portion 11 is disposed inside the frame body portion 13 having a frame shape. The frame body portion 13 is supported by the support portion 15 via the axial portions 14a and 14b. Moreover, the base portion 11 is supported by the frame body portion 13 via the axial portions 12a and 12b. Inner and outer edges of the frame body portion 13 each have a circular shape in plan view. The shape of the frame body portion 13 is not limited to that shown in the drawing as long as the shape is a frame shape surrounding the base portion 11.

Each of the axial portions 12a and 12b and the axial portions 14a and 14b is elastically deformable. The axial portions 12a and 12b couple the base portion 11 with the frame body portion 13 so that the base portion 11 can pivot (oscillate) about the Y1 axis (first axis). The axial portions 14a and 14b couple the frame body portion 13 with the support portion 15 so that the frame body portion 13 can pivot (oscillate) about the X1 axis (second axis) orthogonal to the Y1 axis.

The axial portions 12a and 12b are arranged so as to face each other with the base portion 11 therebetween. Each of the axial portions 12a and 12b has a longitudinal shape extending in a direction along the Y1 axis. Each of the axial portions 12a and 12b is connected at one end to the base portion 11, and connected at the other end to the frame body portion 13. Each of the axial portions 12a and 12b is arranged such that the central axis thereof coincides with the Y1 axis. Each of the axial portions 12a and 12b is torsionally deformed in association with the oscillation of the base portion 11 about the Y1 axis.

The axial portion 14a and the axial portion 14b are arranged so as to face each other with the frame body portion 13 (interposed) therebetween. Each of the axial portions 14a and 14b has a longitudinal shape extending in a direction along the X1 axis. Each of the axial portions 14a and 14b is connected at one end to the frame body portion 13, and connected at the other end to the support portion 15. Each of the axial portions 14a and 14b is arranged such that the central axis thereof coincides with the X1 axis. Each of the axial portions 14a and 14b is torsionally deformed in association with the oscillation of the frame body portion 13 about the X1 axis.

As described above, the base portion 11 is oscillatable about the Y1 axis, while the frame body portion 13 is oscillatable about the X1 axis. Therefore, the base portion 11 can oscillate (reciprocally pivot) about two axes, the X1 axis and the Y1 axis orthogonal to each other. The shape of each of the axial portions 12a and 12b and the axial portions 14a and 14b is not limited to that described above, and may have, for example, a bent or curved portion or a branched portion at at least one place in the middle of the axial portion.

The base portion 11, the axial portions 12a and 12b, the frame body portion 13, the axial portions 14a and 14b, and the support portion 15 are integrally formed. For example, the structure including the base portion 11, the axial portions 12a and 12b, the frame body portion 13, the axial portions 14a and 14b, and the support portion 15 can be formed by etching a silicon substrate. With this configuration, vibration characteristics of the first vibrating system and the second vibrating system can be made excellent. The structure can also be formed by etching an SOI substrate having a first Si layer (device layer), an $SiO_2$ layer (BOX layer), and a second Si layer (handle layer) stacked in this order.

In this case, for example, the base portion 11, the axial portions 12a and 12b, the frame body portion 13, the axial portions 14a and 14b, and the support portion 15 are integrally formed of the first Si layer. The structure including the base portion 11, the axial portions 12a and 12b, the frame body portion 13, the axial portions 14a and 14b, and the support portion 15 may include as necessary the $SiO_2$ layer and the second Si layer.

On a lower surface (surface on the side opposite to the reflector 111) of the frame body portion 13, the permanent magnet 16 is bonded. The method for bonding the permanent magnet 16 with the frame body portion 13 is not particularly limited, and for example, a bonding method using adhesive can be used. The permanent magnet 16 is arranged in plan view so as to be inclined to the X1 axis and the Y1 axis.

In Embodiment 1, the permanent magnet 16 has a longitudinal shape (rod-like shape) extending in a direction inclined to the X1 axis and the Y1 axis. The permanent magnet 16 is magnetized in its longitudinal direction. That is, the permanent magnet 16 is magnetized such that one end thereof is the south pole and the other end is the north pole. The permanent magnet 16 is disposed in plan view so as to be symmetrical about an intersection point of the X1 axis and the Y1 axis.

In Embodiment 1, as shown in FIGS. 7A and 7B, a recess 161 is disposed in an upper surface (one of surfaces) of the permanent magnet 16. With this configuration, the base portion 11 that pivots can be prevented from contacting the permanent magnet 16. In Embodiment 1, an example is described in which one permanent magnet 16 is placed at the frame body portion 13. However, the invention is not limited to that, and for example, two permanent magnets may be placed at the frame body portion 13. In this case, for example, two permanent magnets having a longitudinal shape may be placed at the frame body portion 13 so as to face each other with the intersection point of the X1 axis and the Y1 axis therebetween and be parallel to each other.

An inclined angle θ of the magnetized direction (extending direction) of the permanent magnet 16 relative to the X1 axis is not particularly limited. However, the inclined angle is preferably from 30° to 60°, more preferably from 45° to 60°, and further preferably 45°. By disposing the permanent magnet 16 in this manner, the base portion 11 can pivot smoothly and reliably about the X1 axis.

As the permanent magnet 16, for example, a neodymium magnet, a ferrite magnet, a samarium-cobalt magnet, an alnico magnet, a bonded magnet, or the like can be preferably used. The permanent magnet 16 is obtained by magnetizing a hard magnetic substance, and formed by, for example, placing a hard magnetic substance before magnetization at the frame body portion 13 and then magnetizing the hard magnetic substance. This is because when the permanent magnet 16 that has been already magnetized is intended to be placed at the frame body portion 13, the permanent magnet 16 cannot be placed at a desired position in some cases due to an influence of an external magnetic field or magnetic fields of other components.

Just below the permanent magnet 16, the coil 17 is disposed. That is, the coil 17 is disposed so as to face a lower surface of the frame body portion 13. With this configuration, a magnetic field generated from the coil 17 can efficiently act on the permanent magnet 16. With this configuration, energy saving and a reduction in size of the optical scanner 42 can be achieved. The coil 17 is electrically connected to the signal superimposing unit 18 (refer to FIG. 5).

By applying a voltage from the signal superimposing unit 18 to the coil 17, a magnetic field having a magnetic flux orthogonal to the X1 axis and the Y1 axis is generated from the coil 17. The signal superimposing unit 18 includes an adder (not shown) that superimposes the first drive signal V1 and the second drive signal V2 (or the third drive signal V3) on each other, and applies the superimposed voltage to the coil 17. The first drive signal V1, the second drive signal V2, and the third drive signal V3 will be described in detail.

As described above, the driver circuit 321 generates the first drive signal V1 (voltage for horizontal scanning) that changes periodically with the period T1 as shown in FIG. 4A. That is, the driver circuit 321 generates the first drive signal V1 at a first frequency (1/T1). The first drive signal V1 has a sine-wave-like waveform. Therefore, the optical scanner 42 can effectively perform main scanning with light. The waveform of the first drive signal V1 is not limited to that.

The first frequency (1/T1) is not particularly limited as long as the frequency is suitable for horizontal scanning, and is preferably from 10 to 40 kHz. In Embodiment 1, the first frequency is set so as to be equal to a torsional resonant frequency (f1) of the first vibrating system (torsional vibrating system) composed of the base portion 11 and the pair of axial portions 12a and 12b. That is, the first vibrating system is designed (manufactured) such that the torsional resonant frequency f1 thereof is a frequency suitable for horizontal scanning. With this configuration, the pivot angle of the base portion 11 about the Y1 axis can be increased.

On the other hand, the driver circuit 322 generates, in the case of the first condition described later, the second drive signal V2 (voltage for vertical scanning in the first condition) that changes periodically with the period T2 different from the period T1 as shown in FIG. 4B. Moreover, the driver circuit 322 generates, in the case of the second condition described later, the third drive signal V3 (voltage for vertical scanning in the second condition) whose voltage is higher than that of the second drive signal V2 as shown in FIG. 4B.

The second drive signal V2 (and the third drive signal V3) has a sawtooth-wave-like waveform. Therefore, the optical scanner 42 can effectively perform vertical scanning (sub-scanning) with light. The waveform of the second drive signal V2 (and the third drive signal V3) is not limited to that.

A second frequency (1/T2) is not particularly limited as long as the frequency is different from the first frequency (1/T1) and suitable for vertical scanning, and is preferably from 30 to 80 Hz (about 60 Hz). As described above, the frequency of the second drive signal V2 (and the third drive signal V3) is set to about 60 Hz, while the frequency of the first drive signal V1 is set to 10 to 40 kHz as described above. Therefore, at a frequency suitable for drawing on the display, the base portion 11 can pivot about each of the two axes (the X1 axis and the Y1 axis) orthogonal to each other. However, as long as the base portion 11 can pivot about each of the X1 axis and the Y1 axis, the combination of the frequencies of the first drive signal V1 and the second drive signal V2 (and the third drive signal V3) is not particularly limited.

In Embodiment 1, the frequency of the second drive signal V2 (and the third drive signal V3) is adjusted so as to be different from the torsional resonant frequency (resonant frequency) of the second vibrating system (torsional vibrating system) composed of the base portion 11, the pair of axial portions 12a and 12b, the frame body portion 13, the pair of axial portions 14a and 14b, and the permanent magnet 16.

The frequency (second frequency) of the second drive signal V2 (and the third drive signal V3) is preferably lower than that (first frequency) of the first drive signal V1. That is, the period T2 is preferably longer than the period T1. With this configuration, the base portion 11 can pivot more reliably and more smoothly about the X1 axis at the second frequency while pivoting about the Y1 axis at the first frequency.

When the torsional resonant frequency of the first vibrating system is f1 [Hz] and the torsional resonant frequency of the second vibrating system is f2 [Hz], f1 and f2 preferably satisfy the relation of f1>f2, and more preferably satisfy the relation of f1≥10f2. With this configuration, the base portion 11 can pivot more smoothly about the X1 axis at the frequency of the second drive signal V2 (or the third drive signal V3) while pivoting about the Y1 axis at the frequency of the first drive signal V1. In contrast to this, when the relation of f1≤f2 is satisfied, the first vibrating system may vibrate at the second frequency.

Next, a method for driving the optical scanner 42 will be described. In Embodiment 1, as described above, the frequency of the first drive signal V1 is set equal to the torsional resonant frequency of the first vibrating system. The frequency of the second drive signal V2 (and the third drive signal V3) is set to a value different from the torsional resonant frequency of the second vibrating system and so as to be lower than that of the first drive signal V1 (for example, the frequency of the first drive signal V1 is set to 15 kHz, and the frequency of the second drive signal V2 (and the third drive signal V3) is set to 60 Hz).

For example, the first drive signal V1 shown in FIG. 4A and the second drive signal V2 (or the third drive signal V3) shown in FIG. 4B are superimposed on each other in the signal superimposing unit 18, and the superimposed voltage is applied to the coil 17.

Then, with the first drive signal V1, two magnetic fields are alternately switched: one of the magnetic fields attracts one end (the north pole) of the permanent magnet 16 to the coil 17 and causes the other end (the south pole) of the permanent magnet 16 to move away from the coil 17 (this magnetic field is referred to as "magnetic field A1"); and the other magnetic field causes the one end (the north pole) of the permanent magnet 16 to move away from the coil 17 and attracts the other end (the south pole) of the permanent magnet 16 to the coil 17 (this magnetic field is referred to as "magnetic field A2").

As described above, the permanent magnet 16 is arranged such that the respective ends (magnetic poles) thereof are positioned at two areas divided by the Y1 axis. That is, in plan view of FIG. 6, the north pole of the permanent magnet 16 is positioned on one side of the Y1 axis, while the south pole of the permanent magnet 16 is positioned on the other side. Therefore, with the alternate switching of the magnetic field A1 and the magnetic field A2, a vibration having a torsional vibration component about the Y1 axis is excited in the frame body portion 13. In association with the vibration, the base portion 11 pivots about the Y1 axis at the frequency of the first drive signal V1 while torsionally deforming the axial portions 12a and 12b.

The frequency of the first drive signal V1 is equal to the torsional resonant frequency of the first vibrating system. Therefore, with the first drive signal V1, the base portion 11 can efficiently pivot about the Y1 axis. That is, even when the vibration of the frame body portion 13 having the torsional vibration component about the Y1 axis is small, the pivot angle of the base portion 11 about the Y1 axis in association with the vibration can be increased.

On the other hand, with the second drive signal V2 (or the third drive signal V3), two magnetic fields are alternately switched: one of the magnetic fields attracts one end (the north pole) of the permanent magnet 16 to the coil 17 and causes the other end (the south pole) of the permanent magnet 16 to move away from the coil 17 ("magnetic field B1"); and the other magnetic field causes the one end (the north pole) of the permanent magnet 16 to move away from the coil 17 and attracts the other end (the south pole) of the permanent magnet 16 to the coil 17 ("magnetic field B2").

As described above, the permanent magnet 16 is arranged such that the respective ends (magnetic poles) thereof are positioned at two areas divided by the X1 axis. That is, in plan view of FIG. 6, the north pole of the permanent magnet 16 is positioned on one side of the X1 axis, while the south pole of the permanent magnet 16 is positioned on the other side. Therefore, with the alternate switching of the magnetic field B1 and the magnetic field 32, the frame body portion 13 pivots, together with the base portion 11, about the X1 axis at the frequency of the second drive signal V2 (or the third drive signal V3) while torsionally deforming each of the axial portions 14a and 14b.

The frequency of the second drive signal V2 (and the third drive signal V3) is set extremely low compared to the frequency of the first drive signal V1. The torsional resonant frequency of the second vibrating system is set lower than that of the first vibrating system. Therefore, the base portion 11 can be prevented from pivoting about the Y1 axis at the frequency of the second drive signal V2 (and the third drive signal V3).

According to the optical scanner 42 described above, since the base portion 11 including the reflector 111 having light reflectivity is oscillated about each of two axes orthogonal to each other, reductions in size and weight of the optical scanner 42 can be achieved. The signal light (scanning light) scanned by the optical scanner 42 is emitted to the outside of the housing 41 through the lens 45. The lens 45 is disposed between the optical scanner 42 and the display unit 6.

The lens 45 is a single lens that condenses, between the optical scanner 42 and the display unit 6, the signal light from the optical scanner 42 so that the signal light reflected by the display unit 6 becomes parallel light. That is, it can be said that the lens 45 constitutes a focus adjusting unit that adjusts the focal position of the signal light according to a position to be scanned so that the signal light reflected by the display unit 6 becomes parallel light. By disposing the lens 45, the design flexibility of the posture, shape, or the like of the display unit 6 is increased.

The condensing position adjusting mechanism (condensing position adjusting unit) 44 shown in FIG. 5 has a function of moving an edge surface of the optical fiber 7 on the optical scanner 42 side in an axial direction of the optical fiber 7 to thereby adjust the condensing position of signal light. With this configuration, the condensing position of scanning light formed by scanning the signal light with the optical scanner 42 is adjusted with a comparatively simple and small configuration, so that an image visually recognized by the observer can be optimized.

As shown in FIG. 5, the condensing position adjusting mechanism 44 includes a male screw member 441 fixed to the optical fiber 7 and a female screw member 442 rotatably supported relative to the housing 41 and engaged with the male screw member 441. By rotating the female screw member 442 relative to the housing 41, the condensing position adjusting mechanism 44 can move the optical fiber 7 together with the male screw member 441 in the axial direction of the optical fiber 7.

The signal light emitted from the optical fiber 7 attached to the housing 41 via the condensing position adjusting mechanism 44 is incident through the lens 43 on the reflector 111 of the optical scanner 42. The lens 43 has a function of adjusting the spot diameter of the signal light emitted from the optical fiber 7. Moreover, the lens 43 also has a function of adjusting the radiation angle of the signal light emitted from the optical fiber 7 to substantially collimate the signal light.

Display Unit

As shown in FIGS. 1A, 1B, and 2, the display unit 6 is attached to the rim portion 611 included in the front portion 610 of the frame 2. That is, the display unit 6 is arranged, at the time of use, so as to be positioned in front of the observer's eye EY and on the far side of the optical scanner 42 relative to the observer. With this configuration, a portion bulging forward relative to the observer's face can be prevented from being formed in the HMD 1. The signal light from the optical scanner 42 is incident on the display unit 6, and the display unit 6 is transmissive to visible light.

As shown in FIG. 8, the display unit 6 includes a half mirror area 510 in which an image due to scanning of the signal light is displayed, and a transmission area 520 having a transmittance higher than that of the half mirror area 510 for visible light. In Embodiment 1, the transmission area 520 is adjacent to the half mirror area 510. The half mirror area 510 has a function of partially reflecting the signal light from the optical scanner 42 and transmitting therethrough external light directed from the outside of the display unit 6 to the observer's eye at the time of use.

Specifically, as shown in FIG. 2, the half mirror area 510 includes a transparent substrate (light-transmissive portion) 61 that transmits the external light therethrough and a diffraction grating 62 that is supported by the transparent substrate 61 and reflects the signal light from the optical scanner 42. It can be said that the half mirror area 510 itself is a half mirror, and it can also be said that a half mirror such as the diffraction grating 62 is disposed on the transparent substrate 61. With this configuration, the diffraction grating 62 can have various optical characteristics, the number of components of an optical system can be reduced, and the design flexibility can be enhanced.

For example, with the use of a hologram element as the diffraction grating 62, the emitting direction of the signal light reflected by the half mirror area 510 can be adjusted. The half mirror area 510 is not limited to the configuration described above, and may have a configuration obtained by, for example, forming a semi-transmissive reflection film composed of a metal thin film, a dielectric multilayer film, or the like on a transparent substrate.

The signal light incident on the transmission area 520 is emitted to the outside of the display unit 6. In Embodiment 1, the transmission area 520 includes a diffusion area 521 having a diffuse transmittance higher than that of the half mirror area 510 for visible light. With this configuration, the signal light incident on the diffusion area 521 is diffused. The diffusion area 521 is disposed by forming a diffusion film on the transparent substrate 61. Examples of the diffusion film include, for example, a resin film containing a diffusion material therein.

Next, a scanning area 530 will be described. The scanning area 530 is an area over which signal light from the optical scanner 42 is scanned. The range of the scanning area 530 changes depending on the use condition of the HMD 1. The use condition of the HMD 1 includes the first condition and the second condition. In the first condition, the control unit 33 scans the signal light over the half mirror area 510. That is, as shown in FIG. 9A, the scanning area 530 exists in the half mirror area 510.

In the second condition, the control unit 33 scans the signal light over an area including the transmission area 520 (the diffusion area 521). That is, as shown in FIG. 9B, the scanning area 530 exists across the half mirror area 510 and the transmission area 520 (the diffusion area 521). With this configuration, an image is displayed on the display unit 6 in the first condition, and the control unit 33 scans, in the second condition, the signal light over the area including the transmission area 520 (the diffusion area 521). The area including the transmission area 520 (the diffusion area 521) is the half mirror area 510 and the transmission area 520 (the diffusion area 521) in Embodiment 1.

In Embodiment 1, the control unit 33 applies the first condition when not driving the CCD camera 700, and applies the second condition when driving the CCD camera 700. With this configuration, since the signal light is incident on the transmission area 520 (the diffusion area 521) when the CCD camera 700 is driven, the signal light is emitted from the transmission area 520 (the diffusion area 521). Then, with the emitted light, the observer's intention is indicated to the observed person.

Next, a method for changing the range of the scanning area 530 depending on the use condition of the HMD 1 will be described. As described above, in the first condition, the driver circuit 322 generates the second drive signal V2 (voltage for vertical scanning in the first condition) that changes periodically with the period T2 different from the period T1 as shown in FIG. 4B. In the second condition, the driver circuit 322 generates the third drive signal V3 (voltage for vertical scanning in the second condition) whose voltage is higher than that of the second drive signal V2 as shown in FIG. 4B.

With this configuration, compared to the scanning angle range in the first condition, the scanning angle range in the second condition can be expanded. That is, the range of the scanning area 530 can be changed depending on the use condition of the HMD 1. Since the control unit 33 controls the driver circuit 322, it can be said that the control unit 33 expands the scanning angle range in the second condition compared to the scanning angle range in the first condition.

According to the HMD 1 according to Embodiment 1, the following advantageous effects can be obtained.

The display unit 6 includes the half mirror area 510 that partially reflects signal light from the optical scanner 42 and the transmission area 520 having a transmittance higher than that of the half mirror area for visible light. The control unit 33 that scans the signal light over the half mirror area 510 in the first condition and scans the signal light over the area including the transmission area 520 in the second condition is included. With this configuration, an image is displayed on the display unit 6 in the first condition, and the control unit 33 scans the signal light over the area including the transmission area 520 in the second condition. Hence, it is possible to provide the HMD 1 having a function of allowing the observer to indicate his/her intention to the observed person in the second condition.

The control unit 33 applies the second condition when driving the CCD camera 700. Therefore, when the CCD camera 700 is driven, the signal light is incident on the transmission area 520, and the signal light is emitted from the transmission area 520. Hence, it is possible to provide the FIND 1 having a function of allowing the observer to indicate that the CCD camera 700 mounted on the HMD is capturing an image to the observed person.

Since the transmission area 520 includes the diffusion area 521 having a diffuse transmittance higher than that of the half mirror area 510 for visible light. Therefore, the signal light incident on the diffusion area 521 is diffused. With this configuration, it is possible to expand a range that can be used for allowing the observer to indicate his/her intention to the observed person.

Since the area including the transmission area 520 is the half mirror area 510 and the transmission area 520, the control unit 33 can scan signal light over the half mirror area 510 when scanning the signal light over the transmission area 520. With this configuration, even when the control unit 33 scans the signal light over the transmission area 520, an image can be displayed on the display unit 6.

Since the transmission area 520 is adjacent to the half mirror area 510, the scanning angle range that is expanded when the control unit 33 scans from the half mirror area 510 to the area including the transmission area 520 can be made small.

The transmission area 520 is positioned outside the scanning area 530 where the signal light is scanned over the half mirror area 510. By expanding the scanning angle range more in the second condition than in the first condition, the control unit 33 scans the signal light over the area including the transmission area 520. With this configuration, the control unit 33 can scan the signal light over the transmission area 520.

The optical scanner 42 scans the signal light by resonance in the first direction, and scans the signal light by non-resonance in the second direction intersecting the first direction. The control unit 33 expands the scanning angle range in the second direction more in the second condition than in the first condition. With this configuration, since the scanning angle range of non-resonant scanning is expanded, adjustment of a resonant frequency required when expanding the scanning angle range of resonant scanning is unnecessary. Therefore, the scanning angle range can be expanded easier than in the case of expanding the scanning angle range of resonant scanning.

Since the diffusion area 521 is disposed by forming a diffusion film, the diffusion area 521 can be easily formed.

The optical scanner 42 is positioned on the nose pad portion 21 side of the front portion 610 and on the side closer to the center of the front portion 610 than the optical axis of the signal light reflected by the display unit 6. With this configuration, since the optical scanner 42 is positioned on the nose pad portion 21 side of the front portion 610, a portion bulging forward relative to the observer's face can be prevented from being formed in the HMD 1. Further, since the optical scanner 42 is positioned on the side closer to the center of the front portion 610 than the optical axis of the signal light reflected by the display unit 6, a portion bulging laterally relative to the observer's face can be prevented from being formed in the HMD 1.

Since the signal light generating unit 31 is disposed at the modern portion 630, the weight balance of the HMD 1 can be made excellent.

The base portion 11 and the frame body portion 13 are connected with the axial portions 12a and 12b. The permanent magnet 16 is arranged in plan view in a direction inclined to the X-axis and the Y-axis. The signal superimposing unit 18 applies to the coil 17 a voltage obtained by superimposing on each other a first voltage at the first frequency and a second voltage at the second frequency. The first voltage causes the base portion 11 to oscillate about the Y-axis. The second voltage causes the frame body portion 13 to oscillate about the X-axis. With this configuration, the base portion 11 on which the reflector 111 is disposed can be oscillated about the X-axis and the Y-axis while reducing the number of components.

The optical scanner 42 makes the second voltage (voltage of the second drive signal V2) higher in the second condition than in the first condition to thereby scan the signal light over the area including the transmission area 520. Therefore, the scanning angle range can be easily expanded.

Embodiment 2

Next, Embodiment 2 of the invention will be described.

Figure 10A:
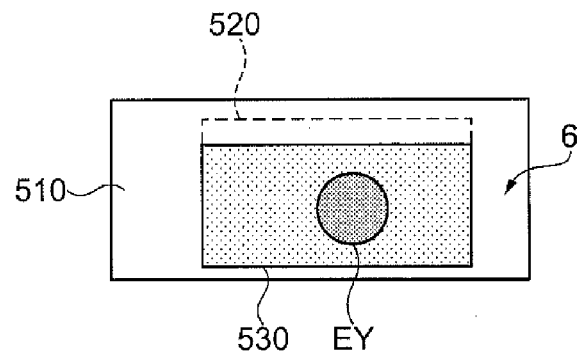
FIGS. 10A and 10B are schematic views each showing a schematic configuration of a display unit and a scanning area according to Embodiment 2.
Figure 10B:
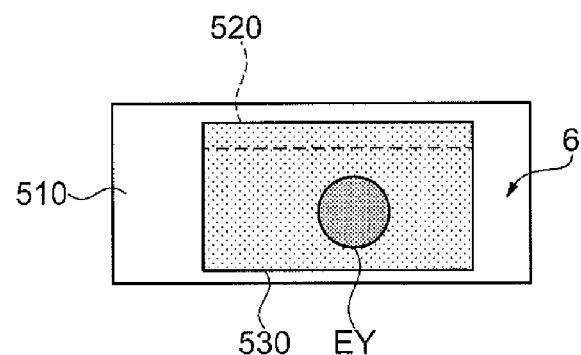

FIGS. 10A and 10B are schematic views each showing a schematic configuration of the display unit 6 and the scanning area 530 according to Embodiment 2.

Hereinafter, Embodiment 2 will be described mainly on differences from Embodiment 1, and descriptions of similar matters are omitted. In FIGS. 10A and 10B, configurations similar to those of Embodiment 1 are denoted by the same references and numerals. An HMD 1A of Embodiment 2 is similar to the HMD 1 of Embodiment 1, excepting that the transmission area 520 does not include the diffusion area 521, that the CCD camera 700 is not included, and that the use condition is different.

FIG. 10A shows a schematic configuration of the display unit 6 and the scanning area 530 in the first condition. FIG. 10B shows a schematic configuration of the display unit 6 and the scanning area 530 in the second condition. As shown in FIGS. 10A and 10B, the transmission area 520 does not include the diffusion area 521.

In Embodiment 1, the control unit 33 applies the second condition when driving the CCD camera 700. In Embodiment 2, however, the second condition can be applied when the observer wants to indicate some kind of intention to the observed person irrespective of the CCD camera 700. Examples of the indication of the intention include indicating a physical disorder. Specifically, when the observer is a disabled person, the observer sometimes cannot indicate properly a physical disorder or the like to the observed person.

When the observer does not have a physical disorder or the like, the observer can observe an image using the scanning area 530 of the HMD 1A as the half mirror area 510 as shown in FIG. 10A. However, when the observer has a physical disorder or the like, the observer applies the second condition via the control unit 33, and can use the scanning area 530 of the HMD 1A as the transmission area 520 as shown in FIG. 10B. At this time, signal light incident on the transmission area 520 is emitted from the transmission area 520.

Hence, according to the HMD 1A according to Embodiment 2, the following advantageous effect can be obtained in addition to the advantageous effects of Embodiment 1. That is, since the observer can apply the second condition when wanting to indicate some kind of intention to the observed person, it is possible to provide the HMD 1A having a function of allowing the observer to indicate his/her intention to the observed person.

Embodiment 3

Next, Embodiment 3 of the invention will be described.

Figure 11A:
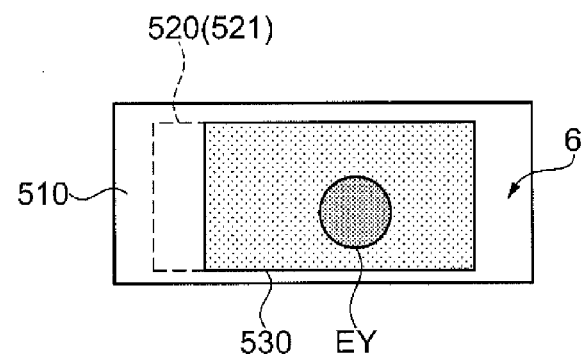
FIGS. 11A and 11B are schematic views each showing a schematic configuration of a display unit and a scanning area according to Embodiment 3.
Figure 11B:
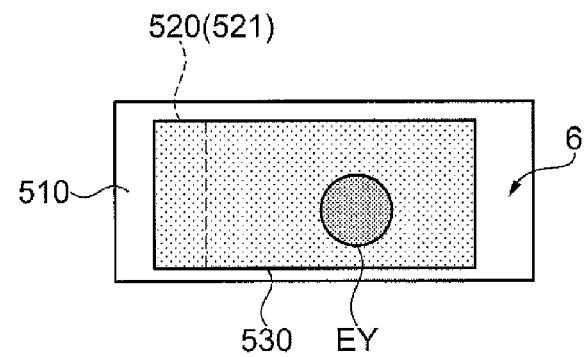

FIGS. 11A and 11B are schematic views each showing a schematic configuration of the display unit 6 and the scanning area 530 according to Embodiment 3.

Hereinafter, Embodiment 3 will be described mainly on differences from Embodiment 1, and descriptions of similar matters are omitted. In FIGS. 11A and 11B, configurations similar to those of Embodiment 1 are denoted by the same references and numerals. An HMD 1B of Embodiment 3 is similar to the HMD 1 of Embodiment 1, excepting that the position of the transmission area 520 (the diffusion area 521) is different, that a fourth drive signal V4 (voltage for horizontal scanning in the second condition) is used instead of the third drive signal V3, and that the scanning area 530 in the second condition is different. In the following, the upper side, lower side, left side, and right side in FIGS. 11A and 11B are referred to as "up", "down", "left", and "right", respectively, for convenience of description.

FIG. 11A shows a schematic configuration of the display unit 6 and the scanning area 530 in the first condition. FIG. 11B shows a schematic configuration of the display unit 6 and the scanning area 530 in the second condition. As shown in FIG. 11A, the transmission area 520 (the diffusion area 521) is positioned to the left of the scanning area 530 in the first condition.

In Embodiment 1, the control unit 33 expands the scanning angle range in the up-and-down direction (second direction) in the second condition compared to the scanning angle range in the up-and-down direction (second direction) in the first condition. In Embodiment 3, on the other hand, the control unit 33 expands a scanning angle range in the left-and-right direction (first direction) in the second condition compared to a scanning angle range in the left-and-right direction (first direction) in the first condition.

Specifically, in the second condition, the driver circuit 321 generates the fourth drive signal V4 (not shown) that changes periodically with the period T1 and whose voltage is higher than that of the first drive signal V1. With this configuration, in the second condition, the scanning angle range in the left-and-right direction (first direction) can be expanded.

Hence, according to the HMD 1B according to Embodiment 3, it is possible to provide the HMD 1B having a function of allowing the observer to indicate his/her intention to the observed person in the second condition.

Embodiment 4

Next, Embodiment 4 of the invention will be described.

Figure 12A:
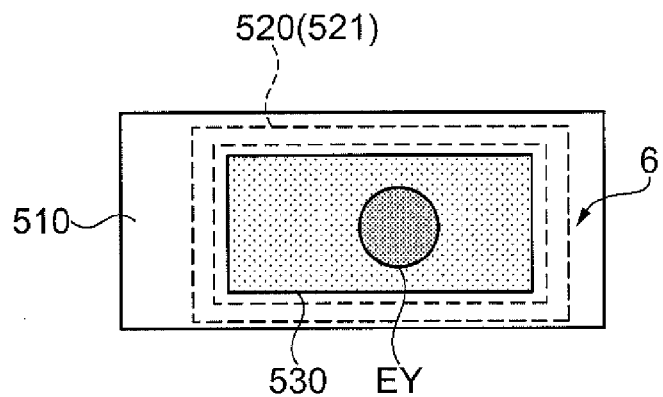
FIGS. 12A and 12B are schematic views each showing a schematic configuration of a display unit and a scanning area according to Embodiment 4.
Figure 12B:
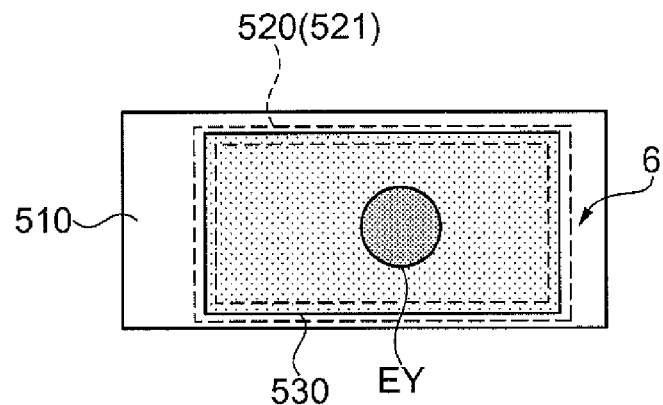

FIGS. 12A and 12B are schematic views each showing a schematic configuration of the display unit 6 and the scanning area 530 according to Embodiment 4.

Hereinafter, Embodiment 4 will be described mainly on differences from Embodiment 1, and descriptions of similar matters are omitted. In FIGS. 12A and 12B, configurations similar to those of Embodiment 1 are denoted by the same references and numerals. An HMD 1C of Embodiment 4 is similar to the HMD 1 of Embodiment 1, excepting that the position of the transmission area 520 (the diffusion area 521) is different, that the third drive signal V3 and the fourth drive signal V4 are used, and that the scanning area 530 in the second condition is different. In the following, the upper side, lower side, left side, and right side in FIGS. 12A and 12B are referred to as "up", "down", "left", and "right", respectively, for convenience of description.

FIG. 12A shows a schematic configuration of the display unit 6 and the scanning area 530 in the first condition. FIG. 12B shows a schematic configuration of the display unit 6 and the scanning area 530 in the second condition. As shown in FIG. 12A, the transmission area 520 (the diffusion area 521) surrounds the scanning area 530 in the first condition.

In Embodiment 1, the control unit 33 expands the scanning angle range in the up-and-down direction (second direction) in the second condition compared to the scanning angle range in the up-and-down direction (second direction) in the first condition. In Embodiment 4, on the other hand, the control unit 33 also expands, in addition to the expansion of the scanning angle range in the up-and-down direction (second direction), the scanning angle range in the left-and-right direction (first direction) in the second condition compared to the scanning angle range in the left-and-right direction (first direction) in the first condition.

Specifically, in the second condition, the driver circuit 321 generates the fourth drive signal V4, and the driver circuit 322 generates the third drive signal V3. With this configuration, in the second condition, the scanning angle ranges in both of the left-and-right direction (first direction) and the up-and-down direction (second direction) can be expanded. In FIGS. 12A and 12B, the half mirror area 510 exists both inside and outside the transmission area 520 (the diffusion area 521). However, the half mirror area located outside the transmission area 520 (the diffusion area 521) may not be needed.

Hence, according to the HMD 1C according to Embodiment 4, the following advantageous effect can be obtained in addition to the advantageous effects of Embodiment 1. That is, since the transmission area 520 (the diffusion area 521) can be expanded compared to that of Embodiment 1, it is possible to expand a range that can be used for allowing the observer to indicate his/her intention to the observed person.

Embodiment 5

Next, Embodiment 5 of the invention will be described.

Figure 13:
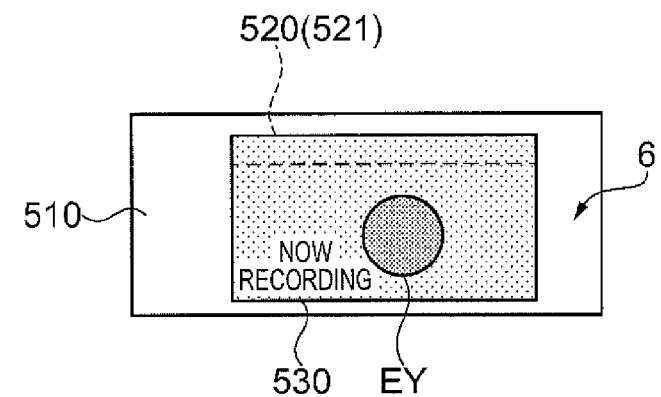
FIG. 13 is a schematic view showing a schematic configuration of a display unit and a scanning area according to Embodiment 5.

FIG. 13 is a schematic view showing a schematic configuration of the display unit 6 according to Embodiment 5.

Hereinafter, Embodiment 5 will be described mainly on differences from Embodiment 1, and descriptions of similar matters are omitted. In FIG. 13, configurations similar to those of Embodiment 1 are denoted by the same references and numerals. An HMD 1D of Embodiment 5 is similar to the HMD 1 of Embodiment 1, excepting that an image for the observed person is displayed in the second condition.

FIG. 13 shows a schematic configuration of the display unit 6 and the scanning area 530 in the second condition. As shown in FIG. 13, "now recording" is displayed in the half mirror area 510.

Hence, according to the HMD 1D according to Embodiment 5, the following advantageous effect can be obtained in addition to the advantageous effects of Embodiment 1. That is, even when the observed person does not know the meaning of emission of signal light from the transmission area 520 (the diffusion area 521), the observer can indicate his/her intention more reliably to the observed person through the confirmation of the display "now recording". An image to be displayed is not limited to "now recording".

Embodiment 6

Next, Embodiment 6 of the invention will be described.

Figure 14:
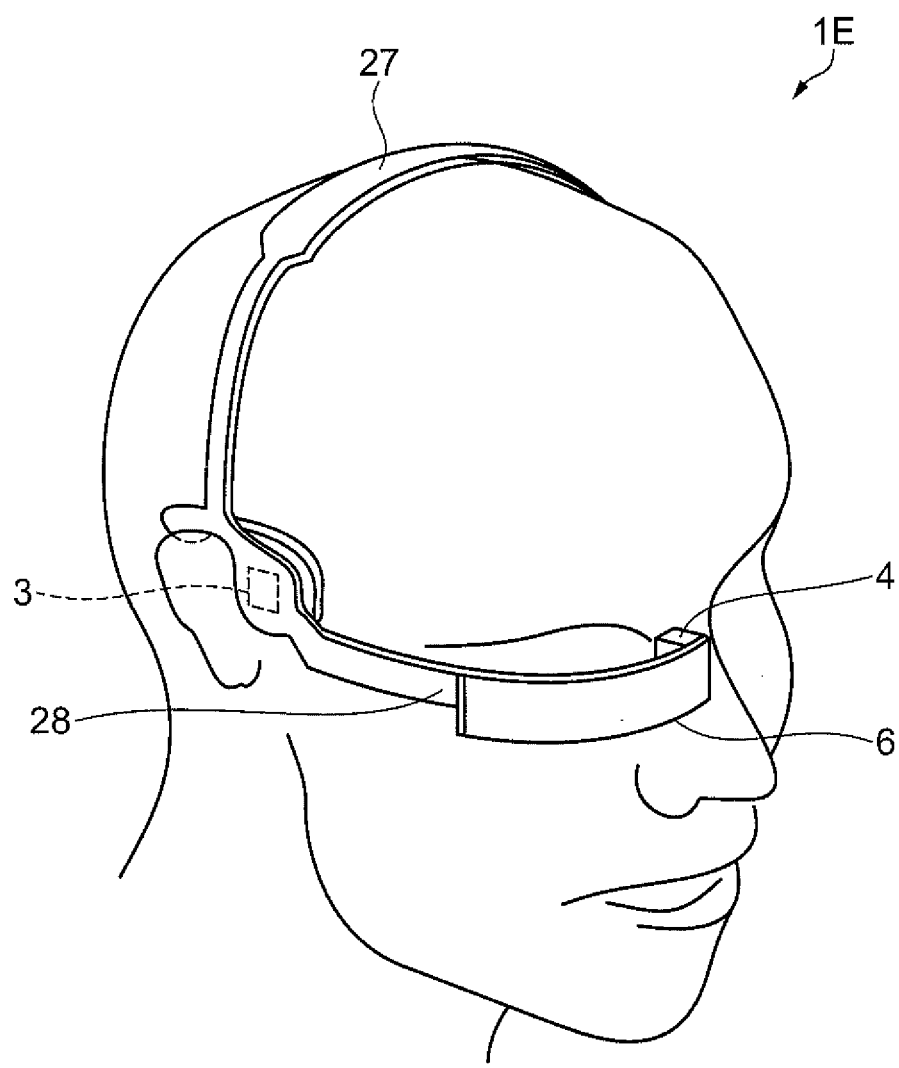
FIG. 14 is a schematic view showing a schematic configuration of an HMD according to Embodiment 6.

FIG. 14 is a schematic view showing a schematic configuration of an HMD according to Embodiment 6.

Hereinafter, Embodiment 6 will be described mainly on differences from Embodiment 1, and descriptions of similar matters are omitted. In FIG. 14, configurations similar to those of Embodiment 1 are denoted by the same references and numerals. An HMD 1E of Embodiment 6 is similar to the HMD 1 of Embodiment 1, excepting that the invention is applied to a headset-type HMD.

The HMD 1E includes a mount portion 27 mounted on the observer's head H and an extending portion 28 extending from the mount portion 27. The signal generating unit 3 is disposed at the mount portion 27. The scanning light emitting unit 4 and the display unit 6 are attached to the extending portion 28.

Hence, according to the HMD 1E according to Embodiment 6, it is possible to provide the HMD 1E having a function of allowing the observer to indicate his/her intention to the observed person in the second condition.

Although the HMD according to the invention has been described so far based on the embodiments shown in the drawings, the invention is not limited to the embodiments. For example, in the HMD of the invention, the configuration of each portion can be replaced with any configuration having a similar function. Moreover, any other configurations can be added to each portion.

In the embodiments described above, an example has been described in which the transmission area 520 is the transparent substrate 61. However, the transmission area 520 is not limited to that. It is sufficient that the transmission area 520 has a transmittance higher than that of the half mirror area 510 for visible light. When the transmission area 520 includes the diffusion area 521, the entire of the transmission area 520 does not, of course, have to be the diffusion area 521. The transmission area 520 may include partially an area that is not the diffusion area 521.

In the embodiments described above, an example has been described in which signal light is scanned over the area including the transmission area 520 (the diffusion area 521) by changing the scanning angle range. However, the invention is not limited to that. For example, a mechanism for moving the optical scanner 42 itself may be disposed. That is, in the second condition, signal light may be scanned over the area including the transmission area 520 (the diffusion area 521) by moving the optical scanner 42 itself, instead of changing the scanning angle range, to change a scanning position. As another example, in the second condition, signal light may be scanned over the area including the transmission area 520 (the diffusion area 521) by arranging an optical member such as a prism on an optical path and changing the optical path.

In the embodiments described above, an example has been described in which in the second condition, the control unit 33 scans signal light over the half mirror area 510 and the transmission area 520 (the diffusion area 521). However, the invention is not limited to that. In the second condition, the control unit 33 may scan signal light only over the transmission area 520.

In Embodiment 1, an example has been described in which the drive signal generating unit 32 generates the first drive signal V1, the second drive signal V2, and the third drive signal V3. However, the invention is not limited to that. A plurality of drive signals different in voltage or the like may be generated according to the use condition.

In the embodiments described above, an example has been described in which a diffusion film is used for forming the diffusion area 521. However, the invention is not limited to that. A diffusing function may be provided by subjecting the transmission area 520 to surface roughening.

In the embodiments described above, an example has been described in which the diffuse transmittance of the diffusion area 521 does not change depending on the use condition. However, the invention is not limited to that. For example, the diffuse transmittance of the diffusion area 521 in the second condition may be higher compared to the diffuse transmittance of the diffusion area 521 in the first condition. With this configuration, since the amount of external light that is diffused by the diffusion area 521 and then incident on the observer's eye can be reduced in the first condition, poor visibility due to the external light can be attenuated. A method for changing the diffuse transmittance of the diffusion area 521 can be realized by using, for example, polymer dispersed liquid crystal (PDLC).

In the embodiments described above, an example has been described in which the signal light generating unit 31 is positioned at the modern portion 630. However, the invention is not limited to that. The signal light generating unit 31 may be positioned anywhere as long as the signal light generating unit 31 can introduce signal light to the optical scanner 42. For example, signal light may be introduced from a portable terminal or the like different from the HMD through the optical fiber 7.

In the embodiments described above, an example has been described in which a moving magnet-type electromagnetic driving system is adopted as a driving unit that causes the base portion 11 to oscillate (reciprocally pivot). However, the driving unit is not limited to that, and may be a moving coil-type electromagnetic driving system. Moreover, a driving system other than the electromagnetic driving system, such as an electrostatic driving system or a piezoelectric driving system may be adopted.

In the embodiments described above, an example has been described in which the optical scanner 42 has a so-called gimbal structure. However, the invention is not limited to that. For example, a uniaxial optical scanner may be used.

In the embodiments described above, an example has been described in which the CCD camera 700 is supported by the frame 2. However, the invention is not limited to that. The CCD camera 700 may be disposed anywhere as long as the CCD camera 700 is electrically connected to the control unit 33 or wirelessly communicable therewith.

In the embodiments described above, an example has been described in which the imaging unit is the CCD camera 700. However, the invention is not limited to that. A CMOS (complementary metal oxide semiconductor) camera or the like may be used.

In the embodiments described above, an example has been described in which right- and left-eye virtual images are formed. However, the invention is not limited to that, and may be configured to form any one of right- and left-eye virtual images.

In the embodiments described above, examples have been described in which the invention is applied to eyeglass- and headset-type HMDs. However, the invention is not limited to them as long as an HMD is mountable on the head H. For example, the invention can also be applied to a helmet-type HMD.

The entire disclosure of Japanese Patent Application No, 2012-284461, filed Dec. 27, 2012 is expressly incorporated by reference herein.

What is claimed is:

1. A head-mounted display comprising:
   a scanning unit that scans signal light modulated according to an image signal;
   a display unit on which the signal light from the scanning unit is incident and that is transmissive to visible light, the display unit including a half mirror area, an entirety of the half mirror area reflecting the signal light from the scanning unit and transmitting external light at all times, and a transmission area having a transmittance higher than that of the half mirror area for visible light; and
   a control unit that scans, based on a use condition, the signal light over an area including the transmission area.

2. The head-mounted display according to claim 1, wherein
   the use condition includes a first condition and a second condition, and
   the control unit scans the signal light over the half mirror area in the first condition and scans the signal light over the area including the transmission area in the second condition.

3. The head-mounted display according to claim 1, further comprising an imaging unit that captures an image, wherein
   the control unit applies the second condition when driving the imaging unit.

4. The head-mounted display according to claim 2, wherein
   the transmission area is positioned outside a scanning area where the signal light is scanned over the half mirror area, and
   the control unit scans the signal light over the area including the transmission area by expanding a scanning angle range more in the second condition than in the first condition.

5. The head-mounted display according to claim 4, wherein
   the scanning unit scans the signal light by resonance in a first direction and scans the signal light by non-resonance in a second direction intersecting the first direction, and
   the control unit expands the scanning angle range in the second direction more in the second condition than in the first condition.

6. The head-mounted display according to claim 1, wherein
   the transmission area includes a diffusion area having a diffuse transmittance higher than that of the half mirror area for visible light.

7. The head-mounted display according to claim 6, wherein
   a diffusion film is formed in the diffusion area.

8. The head-mounted display according to claim 1, wherein
   the area including the transmission area is the half mirror area and the transmission area.

9. The head-mounted display according to claim 1, wherein
   the transmission area is adjacent to the half mirror area.

10. The head-mounted display according to claim 1, further comprising an eyeglass-type frame including a front portion including a nose pad portion, wherein
    the scanning unit is positioned on the nose pad portion side of the front portion and on the side closer to the center of the front portion than an optical axis of the signal light reflected by the display unit.

11. The head-mounted display according to claim 10, further comprising a signal light generating unit that generates the signal light, wherein the frame includes a temple portion connected to the front portion and a modern portion as an end of the temple portion, and the signal light generating unit is disposed at the modern portion.

12. The head-mounted display according to claim 1, wherein the scanning unit further includes a base portion on which a reflector having a reflecting surface reflecting the signal light is disposed, an axial portion that supports the base portion oscillatable about a first axis, a frame body portion that is oscillatable about a second axis intersecting the first axis, a permanent magnet that is disposed at the frame body portion, a coil, and a voltage applying unit that applies a voltage to the coil, the base portion and the frame body portion are connected with the axial portion, the permanent magnet is arranged in plan view in a direction inclined to the first axis and the second axis, and the voltage applying unit applies to the coil a voltage obtained by superimposing on each other a first voltage at a first frequency causing the base portion to oscillate about the first axis and a second voltage at a second frequency causing the frame body portion to oscillate about the second axis.

13. The head-mounted display according to claim 12, wherein the scanning unit scans the signal light over the area including the transmission area by making the second voltage higher in the second condition than in the first condition.

\* \* \* \* \*